(12) United States Patent
Tokgoz et al.

(10) Patent No.: US 10,142,848 B2
(45) Date of Patent: Nov. 27, 2018

(54) METHOD AND APPARATUS FOR CALIBRATING POWER IN FEMTOCELL NETWORKS

(71) Applicant: QUALCOMM Incorporated, San Diego, CA (US)

(72) Inventors: Yeliz Tokgoz, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 13/660,877

(22) Filed: Oct. 25, 2012

(65) Prior Publication Data

US 2013/0109390 A1 May 2, 2013

Related U.S. Application Data

(60) Provisional application No. 61/553,038, filed on Oct. 28, 2011.

(51) Int. Cl.
*H04W 28/08* (2009.01)
*H04W 16/08* (2009.01)
*H04W 84/04* (2009.01)
*H04W 36/22* (2009.01)

(52) U.S. Cl.
CPC ............ *H04W 16/08* (2013.01); *H04W 36/22* (2013.01); *H04W 84/045* (2013.01)

(58) Field of Classification Search
CPC ............ H04W 28/08; H04Q 7/20; H04B 7/00
See application file for complete search history.

(56) References Cited

U.S. PATENT DOCUMENTS

| 7,158,796 | B2 | 1/2007 | Tiedemann, Jr. et al. |
| 8,126,496 | B2 | 2/2012 | Brisebois et al. |
| 8,213,937 | B2 | 7/2012 | Erceg et al. |
| 2004/0229621 | A1 | 11/2004 | Misra |
| 2006/0211440 | A1 | 9/2006 | Nomiya et al. |
| 2009/0042596 | A1 | 2/2009 | Yavuz et al. |
| 2009/0077394 | A1* | 3/2009 | Tsai ..................... G06F 1/3209 713/310 |
| 2009/0264077 | A1 | 10/2009 | Damnjanovic |
| 2010/0220682 | A1* | 9/2010 | Tao et al. ..................... 370/330 |

(Continued)

FOREIGN PATENT DOCUMENTS

| CN | 101039506 A | 9/2007 |
| EP | 0 838 964 A2 | 4/1998 |

(Continued)

OTHER PUBLICATIONS

International Search Report and Written Opinion—PCT/US2012/062490—ISA/EPO—dated Feb. 11, 2013.

(Continued)

*Primary Examiner* — Myron K Wyche
(74) *Attorney, Agent, or Firm* — Arent Fox LLP

(57) ABSTRACT

Apparatus and methods for managing a load in a network of femto nodes are described herein. One or more parameters corresponding to a resource load on a femto node may be detected. The power of the femto node may be adjusted based on the one or more parameters to decrease a resource load on the femto node. One or more other femto nodes may then be notified of the power adjustment.

21 Claims, 11 Drawing Sheets

(56) References Cited

U.S. PATENT DOCUMENTS

| | | | |
|---|---|---|---|
| 2010/0246482 A1* | 9/2010 | Erceg | H04W 24/02 370/328 |
| 2010/0278141 A1* | 11/2010 | Choi-Grogan | H04W 36/0083 370/331 |
| 2011/0183675 A1* | 7/2011 | Bae | H04W 36/04 455/436 |
| 2011/0244870 A1 | 10/2011 | Lee | |
| 2011/0256880 A1* | 10/2011 | Golaup | H04W 28/08 455/453 |
| 2014/0119359 A1* | 5/2014 | Horneman | H04W 72/0426 370/338 |

FOREIGN PATENT DOCUMENTS

| | | |
|---|---|---|
| EP | 2 373 107 A1 | 10/2011 |
| JP | H05-259967 A | 10/1993 |
| JP | 2006-101442 A | 4/2006 |
| JP | 2007-124300 A | 5/2007 |
| JP | 2008-125079 A | 5/2008 |
| JP | 2008-252273 A | 10/2008 |
| JP | 2008-295045 A | 12/2008 |
| JP | 2010-206794 A | 9/2010 |
| JP | 2012034096 A | 2/2012 |
| WO | WO-2005/025261 A1 | 3/2005 |
| WO | WO-2010/049120 A1 | 5/2010 |
| WO | WO-2011/078329 A1 | 6/2011 |

OTHER PUBLICATIONS

QUALCOMM Incorporated: "SON Use Cases analysis for scenarios with HeNBs", 3GPP Draft; R3-101557, 3rd Generation Partnership Project (3GPP), Mobile Competence Centre ; 650, Route Des Lucioles ; F-06921 Sophia-Antipolis Cedex ; France, vol. RAN WG3, No. Montreal, Canada; 20100510, May 1, 2010 (May 1, 2010), XP050425308, [retrieved on May 1, 2010].

Lee K., et al., "Load Balancing with Transmission Power Control in Femtocell Networks," ICACT2011, Feb. 13-16, 2011, pp. 519-522.

* cited by examiner

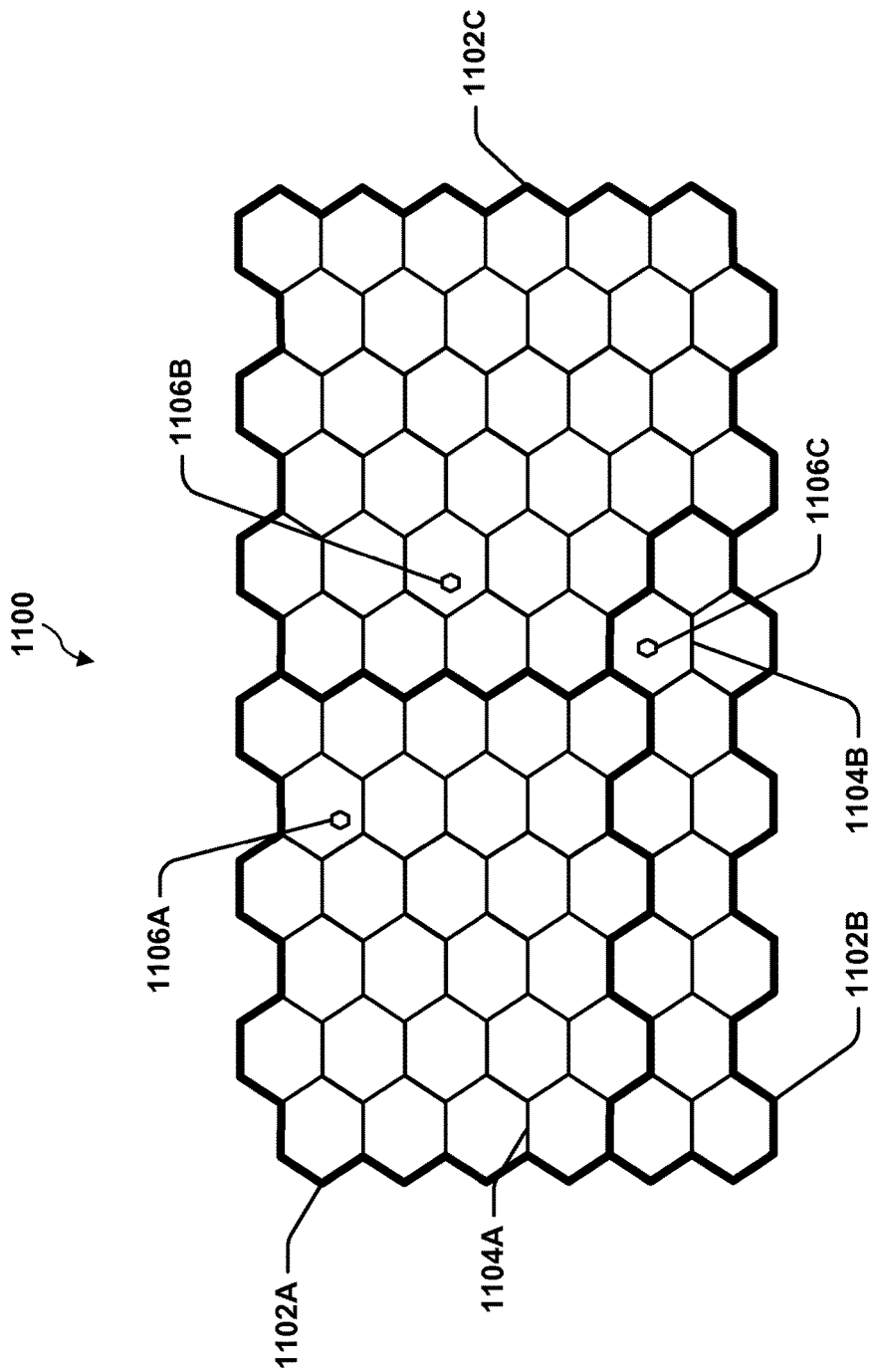

METHOD AND APPARATUS FOR CALIBRATING POWER IN FEMTOCELL NETWORKS

CLAIM OF PRIORITY UNDER 35 U.S.C. § 119

The present application for patent claims priority to Provisional Application No. 61/553,038 entitled "Method and Apparatus for Calibrating Power in Femtocell Networks" filed Oct. 28, 2011, and assigned to the assignee hereof and hereby expressly incorporated by reference herein.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more enhanced wireless coverage and user experience to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for significant capacity growth, richer user experience, in-building, outdoors or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment. Moreover, collections of such low power base stations in a vicinity can form an ad-hoc network to serve one or mobile devices. Such networks can be formed by femto nodes in apartment buildings, on light poles in a city, or other configurations where multiple femto nodes can collaborate to serve one or more devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one aspect, a method for managing load in a network of femto nodes is provided. The method includes detecting one or more parameters corresponding to a resource load on a femto node, adjusting a power of the femto node based on the one or more parameters to decrease a resource load on the femto node, and notifying one or more other femto nodes of the power adjustment.

In accordance with another aspect, an apparatus for managing load in a network of femto nodes is provided. The apparatus includes at least one processor configured to detect one or more parameters corresponding to a resource load on a femto node, adjust a power of the femto node based on the one or more parameters to decrease a resource load on the femto node, and notify one or more other femto nodes of the power adjustment. The apparatus also includes a memory coupled to the at least one processor.

In accordance with another aspect, an apparatus for managing load in a network of femto nodes is provided. The apparatus includes means for detecting one or more parameters corresponding to a resource load on a femto node, means for adjusting a power of the femto node based on the one or more parameters to decrease a resource load on the femto node, and means for notifying one or more other femto nodes of the power adjustment.

In accordance with another aspect, a computer program product for managing a load in a network of femto nodes is provided. The computer program product includes a computer-readable medium that comprises code for causing a least one computer to detect one or more parameters corresponding to a resource load on a femto node, code for causing the at least one computer to adjust a power of the femto node based on the one or more parameters to decrease a resource load on the femto node, and code for causing the at least one computer to notify one or more other femto nodes of the power adjustment.

In accordance with another aspect, a method for adjusting power of a femto node is provided. The method includes receiving a notification of a power adjustment performed by a nearby femto node in a network of femto nodes and adjusting a power of a femto node based on the power adjustment.

In accordance with another aspect, an apparatus for adjusting power of a femto node is provided. The apparatus includes at least one processor configured to receive a notification of a power adjustment performed by a nearby femto node in a network of femto nodes and adjust a power of a femto node based on the power adjustment. The apparatus also includes a memory coupled to the at least one processor.

In accordance with another aspect, an apparatus for adjusting power of a femto node is provided. The apparatus includes means for receiving a notification of a power adjustment performed by a nearby femto node in a network of femto nodes and means for adjusting a power of a femto node based on the power adjustment.

In accordance with another aspect, a computer program product for adjusting power of a femto node is provided. The computer program product includes a computer-readable medium that includes code for causing at least one computer to receive a notification of a power adjustment performed by a nearby femto node in a network of femto nodes and code for causing the at least one computer to adjust a power of a femto node based on the power adjustment.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 11 illustrates an example of a coverage map having several defined tracking areas.

DETAILED DESCRIPTION

Figure 1:
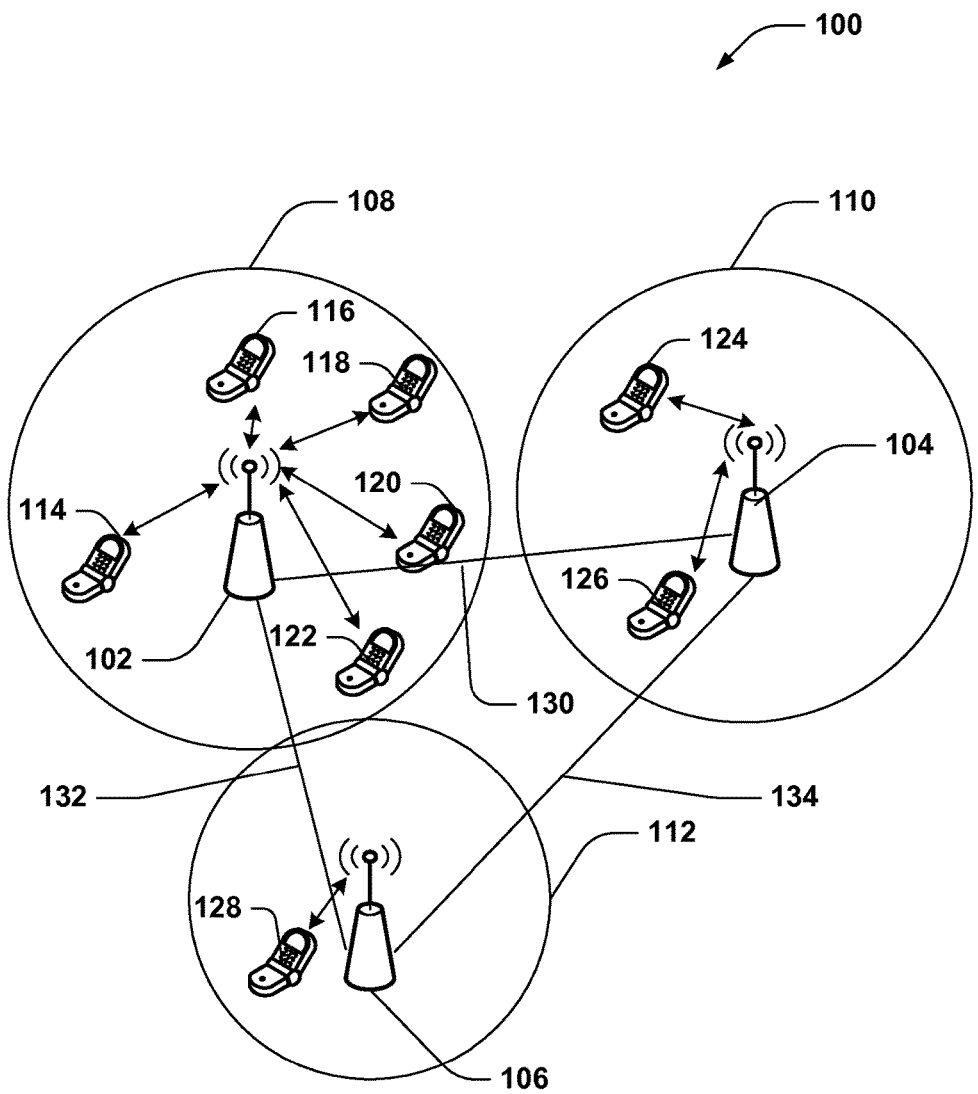
FIG. 1 is a block diagram of an example system that facilitates establishing a femto node network to provide wireless network access to a plurality of devices.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a network of a plurality of low power base stations can perform an autonomous power calibration procedure to manage interference and/or ensure adequate network coverage for one or more devices. In addition, the low power base stations can consider other factors as part of calibrating power, such as loading and capacity on one or more of the low power base stations. As used herein, load may refer to a resource load. In this regard, power can be adjusted for a low power base station to increase or decrease the load of the low power base station, which can also include adjusting power of a different low power base station to accordingly decrease or increase its load. In one example, determining whether to adjust power to manage a load on the low power base station can be based in part on whether other low power base stations are near the low power base station (e.g., within a threshold distance of the low power base station). In another example, determining whether to adjust power can be based on one or more load expectation parameters, such as a load expected given a current time of day or other learned parameters. Furthermore, in an example, a low power base station can redirect a mobile device that may be impacted by the power adjustment. Thus, a femto node can autonomously adjust power to receive a desired loading in a network of femto nodes.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates managing load of a femto node by adjusting power. System 100 comprises femto nodes 102, 104 and 106, which can be substantially any type of low power base station or at least a portion thereof providing respective coverage areas 108, 110, and 112. System 100 also includes a plurality of devices 114, 116, 118, 120, 122, 124, 126, and 128 that communicate with the femto nodes 102, 104, or 106 to receive wireless network access. As described, the femto nodes 102, 104, and 106 can communicate with the wireless network (not shown) over a broadband connection. In addition, femto nodes 102, 104, and 106 can communicate with one another over a backhaul connection 130, 132, and/or 134. For example, upon initialization, one or more of the femto nodes 102, 104 and/or 106 can communicate with one another to form an ad-hoc network. Alternatively, femto nodes 102, 104 and/or 106 can communicate with one another through central entity such as a gateway or similar network element. Upon forming the network, the femto nodes 102, 104, and/or 106 can communicate to determine parameters related to serving the various devices connected thereto. The femto nodes 102, 104, and/or 106 can accordingly coordinate parameters to improve network access provided to the devices.

As described, deployment of the femto nodes 102, 104, and 106 can be unplanned such that the femto nodes and/or devices communicating therewith can cause interference to other femto nodes or related devices. Thus, femto nodes 102, 104, and 106 can perform an autonomous power calibration to attempt to ensure their transmissions do not interfere with one another. In one example, the femto nodes 102, 104, and/or 106 can coordinate transmission power, transmission resources, and/or the like over respective backhaul connections 130, 132, and/or 134. In another example, a central entity connected to each of the femto nodes 102, 104, and 106 can facilitate coordinating power, resources, etc. therebetween.

In addition, the femto nodes 102, 104, and 106 can modify transmission power based on a load thereof. For instance, the load on the femto nodes 102, 104, and 106 may refer to an amount of one or more communication resources being used by the respective femto node, which may relate to, but is not limited to relating to, the number of devices being served by the respective femto node, the number of resources provided by the femto node to the devices, and/or the like. For example, femto node 102, supporting communications for devices 114, 116, 118, 120, and 122, can determine that capacity is running low. For example, this can be based on measuring one or more capacity limitations against a threshold, such as a channel element availability, a downlink channel resource availability, a received uplink power level or resource availability, a number of scheduled resources, backhaul bandwidth availability and/or the like. Where such measurements achieve the threshold, for example, femto node 102 can determine to lower its transmit power to shrink its coverage area. This may impact communications with one or more of the devices 114, 116, 118, 120, and/or 122, as the lowered power may result in the femto node 102 being out of range.

In one aspect, femto node 106 can determine that femto node 102 has decreased transmission power, and femto node 106 can thus increase transmission power to attempt to provide coverage for one or more devices losing coverage of femto node 102 (e.g., device 122). For instance, femto node 102 can notify femto node 106 of the power adjustment over backhaul connection 132 (and/or femto node 104 over backhaul connection 130). In another example, as described, a centralized entity can be used to facilitate notifying femto node 106 and/or femto node 104 of the decreased power of femto node 102. In one example, femto node 102 can indicate a level of power adjustment, and femto node 106 can adjust its power based on the level indicated by femto node 102 (e.g., an inverse or other proportion thereof). This power adjustment can be computed by femto node 102 based on the measurement reports of a radio frequency (RF) environment sent by mobile devices served by femto node 102. For example, where femto node 102 indicates a decreased power, femto node 106 can increase power to fill a coverage gap in the respective coverage areas left as a result of the decreased power of femto node 102.

In other examples, one or more of the devices 114, 116, 118, 120, and/or 122 can provide femto node 102 with a report of a radio frequency (RF) environment to allow the femto node 102 to determine whether other femto nodes are within a vicinity and/or are capable of receiving communications from one or more devices when femto node 102 decreases power. For example, the reporting can be in the form of measurement reports for mobility, which can indicate neighboring femto nodes and associated signal strengths. In one example, device 122 can measure signals from femto node 106 and report to femto node 102. Femto node 102 can determine from the report whether femto node 106 can handle communications with device 122 if femto node 102 decreases transmit power such to become out of range for device 122. For example, femto node 102 can determine whether a signal strength of femto node 106 reported by device 122 is at least at a threshold level sufficient to allow femto node 106 to increase power and handle communications with device 122 where femto node 102 decreases power. In addition, this can include femto node 102 analyzing its own received signal strength at a device to determine the effect of a change on the device, e.g., a signal strength of femto node 102 reported by device 122 to determine that device 122 may become out of range if femto node 102 decreases power. In another example, femto node 102 can also consider current transmit power of femto node 106 (e.g., learned through the backhaul, through signaling by femto node 106, etc.), to decide whether femto node 106 is capable of increasing transmit power. Femto node 102 can determine whether to decrease transmit power further based on this consideration.

In addition, for example, where femto node 102 determines one or more of the devices 114, 116, 118, 120 and/or 122 that may become out of range if femto node 102 lowers power, femto node 102 can attempt to first, e.g., prior to lowering power, redirect the one or more devices 114, 116, 118, 120 and/or 122 to other femto nodes. For example, femto node 102 can receive a measurement report from the devices 114, 116, 118, 120 and/or 122, as described, and can determine whether one or more femto nodes, such as femto node 104 and/or 106, are within range of the devices 114, 116, 118, 120 and/or 122. If so, and if the femto node 102 determines a device 114, 116, 118, 120 and/or 122 may become out of range, femto node 102 can attempt to handover the device 114, 116, 118, 120 and/or 122 to a femto node or to a macro node with the highest signal strength in the reported measurement report prior to femto node 102 lowering power. Moreover, in an example, upon identifying one or more devices 114, 116, 118, 120 and/or 122 that may become out of range, femto node 102 can wait to lower power until the devices 114, 116, 118, 120 and/or 122 are in an idle communication mode such that active mode communications are not impacted by the power adjustment, and/or to allow idle mode reselection from the devices to another femto node.

Furthermore, in an example, femto node 102 can adjust power based on one or more load expectation parameters of femto node 102 or other femto nodes—e.g., femto nodes 104 and/or 106. For example, instead of adjusting power based on an actual load, femto node 102 can evaluate one or more parameters that are indicative of an expected load, such as a time of day, a day of the week, and/or other learned parameters. For example, femto node 102 can determine a time schedule for loading based on historical load parameters, and can accordingly predict periods of high loading. In this example, femto node 102 can lower power when high loading is expected. In addition, femto node 102 can predict similar statistics of femto nodes 104 and/or 106 and can accordingly increase power during periods of high loading for those nodes to help with load balancing. Moreover, femto node 102 can perform other predictions as well, such as determining whether femto nodes 104 and/or 106 are over a threshold load for over a threshold period of time. In this case, femto node 102 may determine not to increase power over a threshold level so as not to constantly lend out resources for the femto nodes 104 and/or 106 (e.g., which could cause undue burden on the femto node 102).

Figure 2:
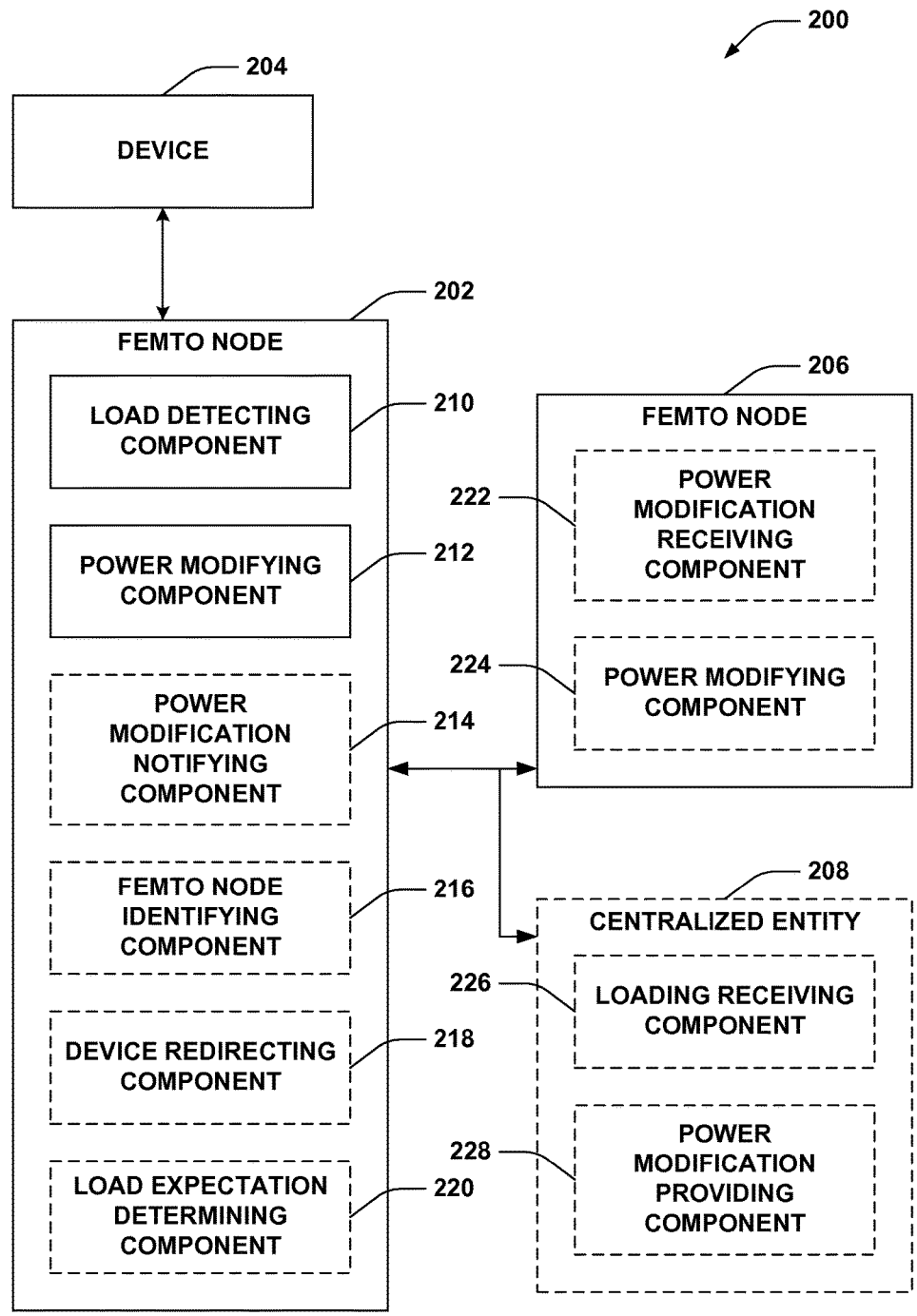
FIG. 2 is a block diagram of an example system that facilitates adjusting power of femto nodes in a network to manage loading.

FIG. 2 illustrates an example system 200 for adjusting power of a femto node to account for loading on the femto node and/or other femto nodes. System 200 comprises a femto node 202 that provides wireless network access to a device 204, as described, as well as a femto node 206 that is near femto node 202. Femto nodes 202 and 206 can communicate, as described, to manage access provided to one or more devices, such as device 204. Thus, for example, femto node 202 can be similar to one of femto nodes 102, 104, or 106, and femto node 206 can be similar to another one of femto nodes 102, 104, or 106. In this example, femto nodes 202 and 206 can communicate over a backhaul or optionally through a centralized entity 208 to manage parameters related to providing network access to the devices. As described, device 204 can be similar to one of devices 114, 116, 118, 120, 122, 124, 126, and/or 128, and can be a UE, modem (or other tethered device), a portion thereof, etc.

Femto node 202 can include a load detecting component 210 for determining a load on femto node 202 based on one or more parameters and a power modifying component 212 for adjusting power of the femto node 202 based on the determined load. Femto node 202 can also optionally include a power modification notifying component 214 for notifying one or more other femto nodes of the power adjustment, a femto node identifying component 216 for determining whether one or more other femto nodes are near femto node 202 such to receive handover of one or more devices, a device redirecting component 218 for redirecting devices potentially impacted by the power adjustment, and/or a load expectation determining component 220 for obtaining one or more parameters related to an expected load of femto node 202.

Femto node 206 can include similar components of femto node 202 to facilitate performing similar functionality (and/or vice versa). Femto node 206 can optionally include a power modification receiving component 222 for determining that a nearby femto node adjusted a power and/or a power modifying component 224 for adjusting a power of femto node 206 based on the determined adjusted power of the nearby femto node.

Centralized entity 208 can include a load receiving component 226 that can obtain parameters regarding a load on one or more femto nodes. In some aspects, load receiving component may also be configured to obtain RF measurement reports from mobile devices served by these femto nodes. Centralized entity 208 may also include a power modification providing component 228 for computing the required power adjustments and instructing one or more femto nodes to adjust power based on the parameters regarding the load and the mobile device RF measurement reports.

According to an example, femto node 202 can provide wireless network access to device 204 and/or other devices, as described. Load detecting component 210 can analyze one or more parameters to determine a load, such as a resource load, on the femto node 202. For example, the one or more parameters can correspond to capacity limitation parameters, such as availability of a channel element (e.g., a logical communications channel and/or resources related thereto), a downlink channel resource availability, a received uplink power level or resource availability, a backhaul bandwidth availability, and/or the like. Moreover, load detecting component 210 can obtain and/or analyze the parameters based on a timer, an event trigger, and/or the like. The parameters can indicate whether femto node 202 is overloaded, and thus analyzing the parameters allows the femto node 202 to determine whether to adjust a power to lessen the load, for example.

Where load detecting component 210 determines the load is over a threshold (e.g., the one or more analyzed parameters achieve a threshold), power modifying component 212 can adjust a power of femto node 202 to shrink a coverage area, which can result in the femto node 202 becoming out of range for some served devices, such as device 204. For example, power modifying component 212 can adjust the power relative to the one or more analyzed parameters (e.g., based on a level at which the parameters exceed or do not exceed a threshold). In one example, where load detecting component 210 determines that channel element availability is below a threshold, power modifying component 212 can lower a transmit power of femto node 202 based on a difference between the channel element availability and the threshold—e.g., using a direct proportion, a stepping function based on ranges of difference between the parameter and the threshold, and/or the like.

In an example, power modification receiving component 222 can detect the power adjustment by femto node 202. This can be based on receiving an indication from femto node 202, in one example where power modification notifying component 214 transmits an indication to the femto node 206 of the power adjustment. In another example, power modification receiving component 222 can detect the power adjustment based on receiving signals from femto node 202 and detecting a modified signal strength therefrom. In any case, power modifying component 224 can adjust power of the femto node 206 based on the power adjustment of femto node 202. In an example, power modifying component 224 can perform the power adjustment of femto node 206 proportionally to the power adjustment performed by femto node 202, as a fixed power adjustment, and/or the like.

Further, in determining whether to adjust power to manage a load, femto node identifying component 216 can be used to determine whether other femto nodes are nearby that can perform corresponding power adjustments in an attempt to fill coverage gaps left by femto node 202 decreasing power to manage the load. In one example, femto node identifying component 216 can detect one or more nearby femto nodes based on a report received from device 204, such as a measurement report for mobility. In one example, femto node identifying component 216 can analyze a signal strength reported by device 204 and/or other devices for femto node 202, and where the signal strength is below a threshold, femto node identifying component 216 can determine the device 204 or other devices can become out of range when femto node 202 decreases power.

In this case, for example, femto node identifying component 216 can determine to obtain measurement reports from the device 204 and determine whether one or more femto nodes (or base stations) in the measurement reports, such as femto node 206, can serve device 204 when femto node 202 becomes out of range, and power modifying component 212 can determine whether to adjust power of femto node 202 further based on whether the one or more femto nodes can serve the device 204. For example, femto node identifying component 216 can determine such based on the reported signal strength of the femto node 206 (e.g., whether the signal strength is high enough such that an allowed increase in power at the femto node 206 may result in the femto node 206 serving the device 204 at least at a threshold signal quality). In another example, femto node identifying component 216 can measure signals from the femto node 206 to determine whether the femto node 206 can serve devices impacted by femto node 202 decreasing power. Moreover, for example, femto node identifying component 216 can determine whether the femto node 206 is already transmitting at full power, and thus cannot increase power such to serve device 204.

In another example, where femto node 202 determines that femto node 206 can serve device 204, device redirecting component 218 can redirect device 204 to femto node 206 before power modifying component 212 decreases power. For example, this can include performing reselection of the device 204 from femto node 202 to femto node 206. In another example, power modifying component 212 can wait until device 204 and/or other devices enter an idle communications mode before power modifying component 212 adjusts the power.

Moreover, for example, load expectation determining component 220 can determine one or more parameters related to an expected load at femto node 202. For example, the expected load can be determined based on observing load according to a time of day. In this example, load expectation determining component 220 can determine a time when load is expected to be over a threshold based on the observed loading, and can cause load detecting component 210 to detect high load based on the expected load, such that power modifying component 212 can adjust power of femto node 202. In another example, load expectation determining component 220 can determine an expected load on another femto node based on received power modification notifications, as described, and can cause power modifying component 212 to increase power based on the expected load. In another example, load expectation determining component 220 can determine that the other femto node is frequently loaded, and can forego adjusting power.

Though described in terms of increased load, it is to be appreciated that the components and functionalities described can also be applied for decreasing load. For example, where load detecting component 210 determines that load on femto node 202 is decreasing (e.g., based on similar parameters), power modifying component 212 can increase a transmit power to expand coverage. This can also be based on a power at which femto node 202 is operating respective to an original or configured power. In addition, in this example, power modification notifying component 214 can notify of the power increase to one or more other femto nodes, which can in turn lower a power to shrink coverage area.

In yet another example, centralized entity 208 can be used to facilitate communicating between the femto node 202 and 206 and/or managing parameters for providing network access. In one example, load receiving component 226 can obtain parameters regarding loading at one or more femto nodes, such as femto nodes 202 and 206. In one example, load for femto node 202 can be reported to centralized entity 208 by load detecting component 210. As described above, load receiving component 226 may also be configured to obtain RF measurement reports from mobile devices served by femto nodes. In some aspects, load receiving component 226 may also take the mobile device RF measurements into account in determining power adjustments. Power modification providing component 228 can compute power modifications for femto nodes 202 and 206 based on reported load and/or the mobile device RF measurement reports. For example, power modification providing component 228 can consider the reported load, relative location of the femto nodes 202 and 206, current power of the femto nodes 202 and 206, and/or the like in computing the power modifications. Upon determining the power modification, power modification providing component 228 can indicate a level of power modification to each of femto node 202 and/or femto node 206, for example.

Figure 3:
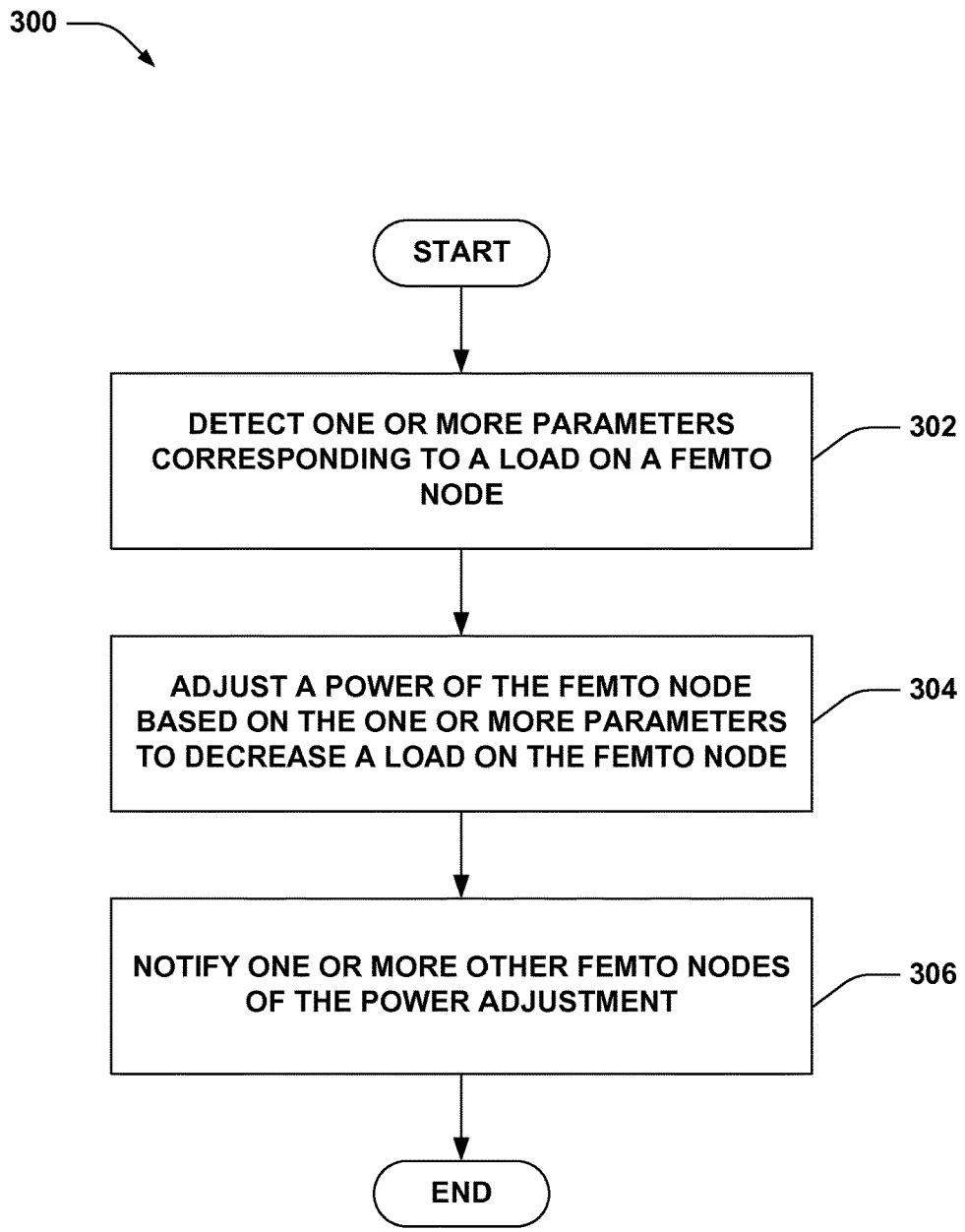
FIG. 3 is a flow chart of an aspect of an example methodology for adjusting power of a femto node to modify a load.
Figure 4:
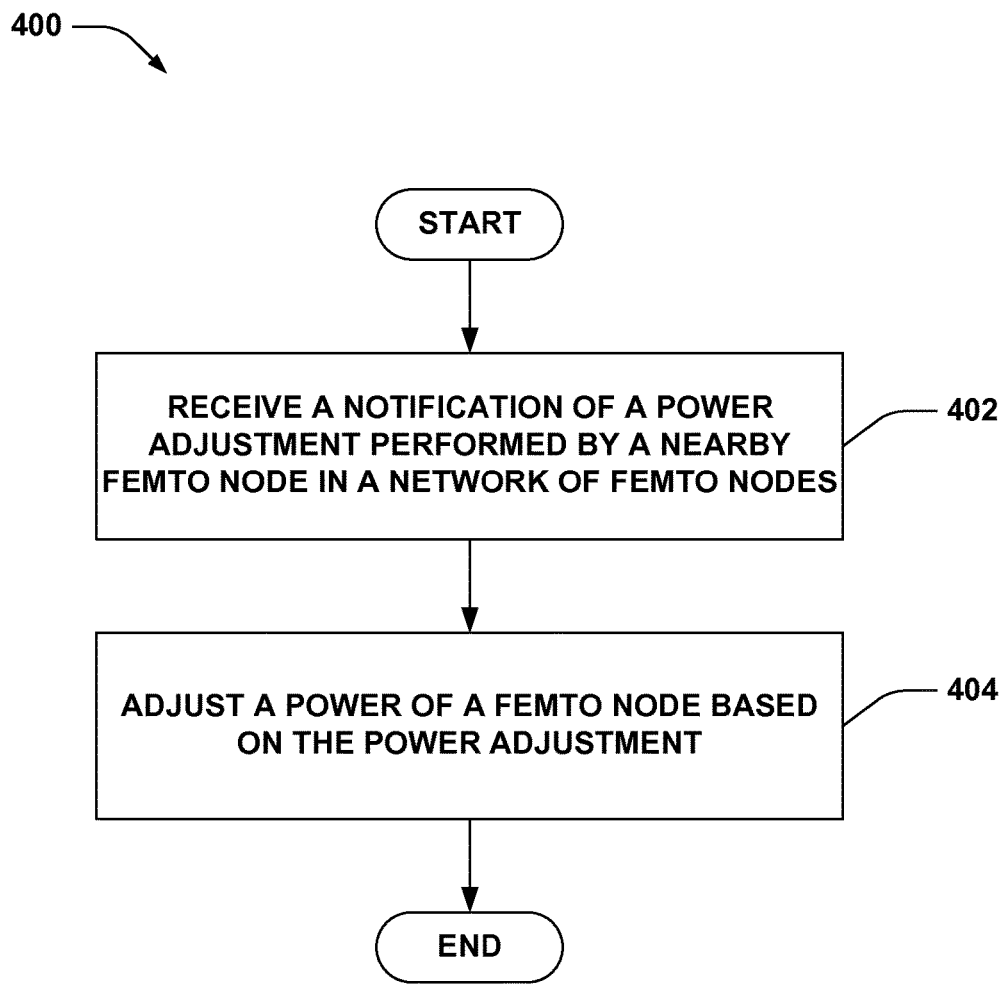
FIG. 4 is a flow chart of an aspect of an example methodology for adjusting power of a femto node based on a power adjustment of a nearby femto node.

Referring to FIGS. 3-4, example methodologies relating to adjusting power to manage load in a network of femto nodes are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, an example methodology 300 is displayed that facilitates adjusting a power to modify a load on a femto node.

At 302, one or more parameters corresponding to a load on a femto node can be detected. For example, the one or more parameters can correspond to a channel element availability, a downlink channel resource availability, a received uplink power level or resource availability, a backhaul bandwidth availability, and/or the like. In another example, the one or more parameters can correspond to an expected load on the femto node. Where one or more of the parameters achieve a threshold, for example, this can indicate that the femto node is overloaded, for example, and that power of the femto node should be accordingly adjusted to lessen the load.

At 304, a power of the femto node can be adjusted based on the one or more parameters to decrease a load on the femto node. For example, this can include modifying a transmit power of the femto node. Where the one or more parameters indicate the femto node is overloaded, the femto node can decrease the transmit power, which can cause the femto node to become out of range to one or more devices. For example, the signal quality of the femto node degrades at the devices due to the decrease in power, which can cause the devices to engage other femto nodes for wireless network access. The power of the femto node can be adjusted at 304 as proportional to the one or more parameters and/or a level at which the one or more parameters exceed or are below a threshold. In addition, the power can be adjusted based on other considerations, as described, including at least one of determining one or more other femto nodes that are nearby and can communicate with one or more devices affected by the power adjustment at the femto node, redirecting the one or more devices to the one or more other femto nodes, determining one or more devices transitioning to an idle communications mode, and/or the like.

At 306, one or more other femto nodes can be notified of the power adjustment. For example, this can include communicating the power adjustment and/or related parameters to the one or more other femto nodes over a backhaul connection and/or via a centralized entity. In any case, this can cause the one or more other femto nodes to increase power to fill coverage gaps left by the femto node decreasing its power.

Referring to FIG. 4, an example methodology 400 for adjusting femto node power is illustrated.

At 402, a notification of a power adjustment performed by a nearby femto node in a network of femto nodes can be received. The notification can be received from the nearby femto node over a backhaul connection and/or via a centralized entity. The notification can include the power adjustment value, in one example.

At 404, a power of a femto node can be adjusted based on the power adjustment. As described, for example, the power can be proportional to the power adjustment to attempt to fill coverage gaps left by the nearby femto node. Adjusting the power can include modifying a transmit power, as described, which can result in devices engaging the femto node where transmit power is increased (e.g., due to increase in signal quality measured by the devices).

It will be appreciated that, in accordance with one or more aspects described herein, inferences can be made regarding determining a load on a femto node, whether to adjust power based on the determined load, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 5:
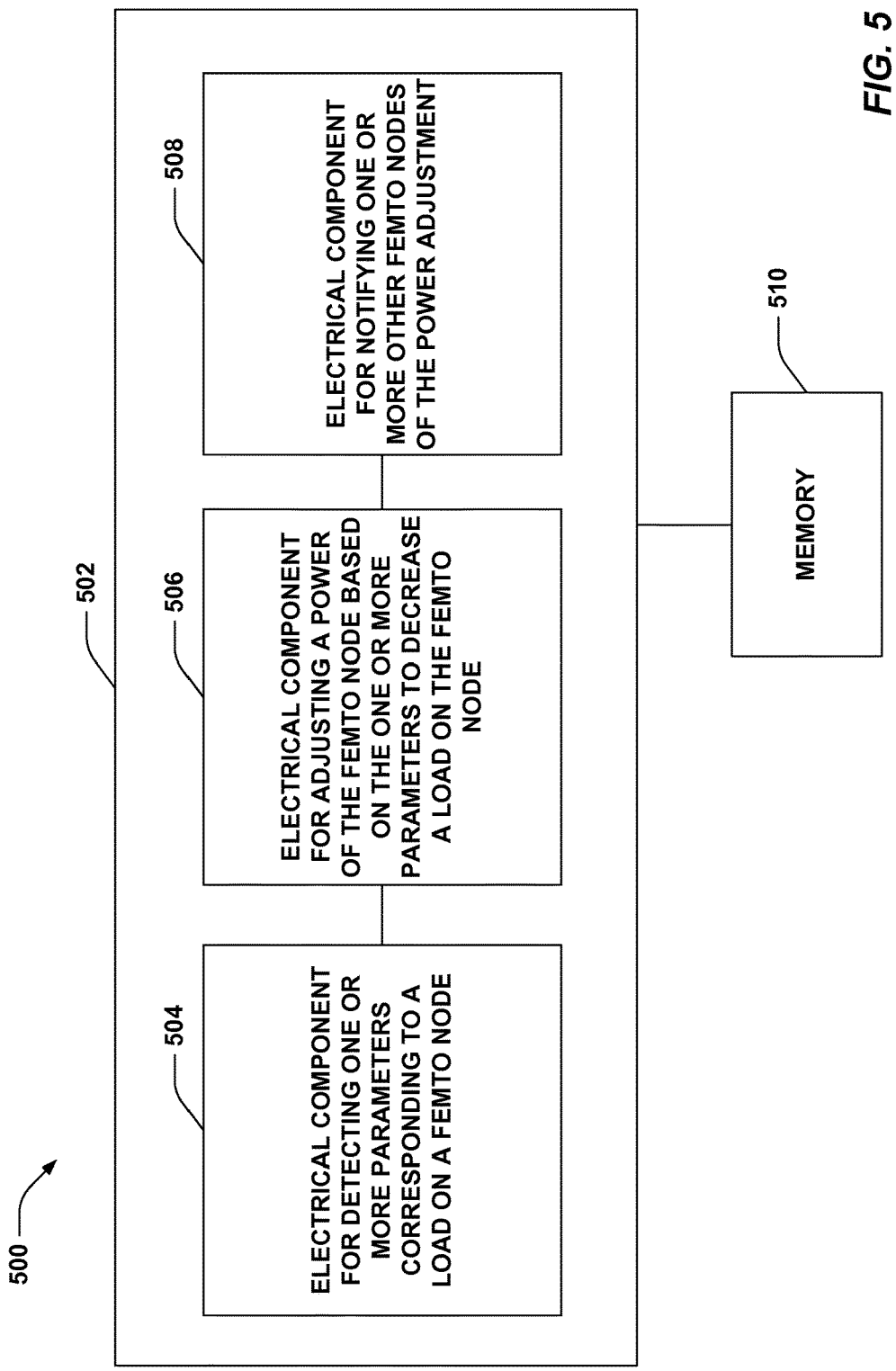
FIG. 5 is a block diagram of an example system that adjusts power of a femto node to modify a load.

With reference to FIG. 5, illustrated is a system 500 for adjusting power of a femto node. For example, system 500 can reside at least partially within a femto node. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 504 for detecting one or more parameters corresponding to a load on a femto node. As described, electrical component 504 can detect that the one or more parameters achieve a threshold such to result in adjusting a power. The one or more parameters can correspond to a channel element availability, downlink channel resource availability, etc. Further, logical grouping 502 can comprise an electrical component 506 for adjusting a power of the femto node based on the one or more parameters to decrease a load on the femto node.

As described, in an example, the power can be adjusted proportionally to the difference between the one or more parameters and a threshold or otherwise. Electrical component 506 can adjust the power based on other factors as well, as described, such as determining one or more other femto nodes that can receive handover of one or more devices communicating with the femto node, determining that a device transitions to an idle communications mode, etc. Further, logical grouping 502 can include an electrical component 508 for notifying one or more other femto nodes of the power adjustment.

For example, electrical component 504 can include a load detecting component 210, as described above. In addition, for example, electrical component 506, in an aspect, can include a power modifying component 212, as described above. Moreover, electrical component 508 can include a power modification notifying component 214, for example.

Additionally, system 500 can include a memory 510 that retains instructions for executing functions associated with the electrical components 504, 506, and 508. While shown as being external to memory 510, it is to be understood that one or more of the electrical components 504, 506, and 508 can exist within memory 510. In one example, electrical components 504, 506, and 508 can comprise at least one processor, or each electrical component 504, 506, and 508 can be a corresponding module of at least one processor. Moreover, in an additional or alternative example, electrical components 504, 506, and 508 can be a computer program product comprising a computer readable medium, where each electrical component 504, 506, and 508 can be corresponding code.

Figure 6:
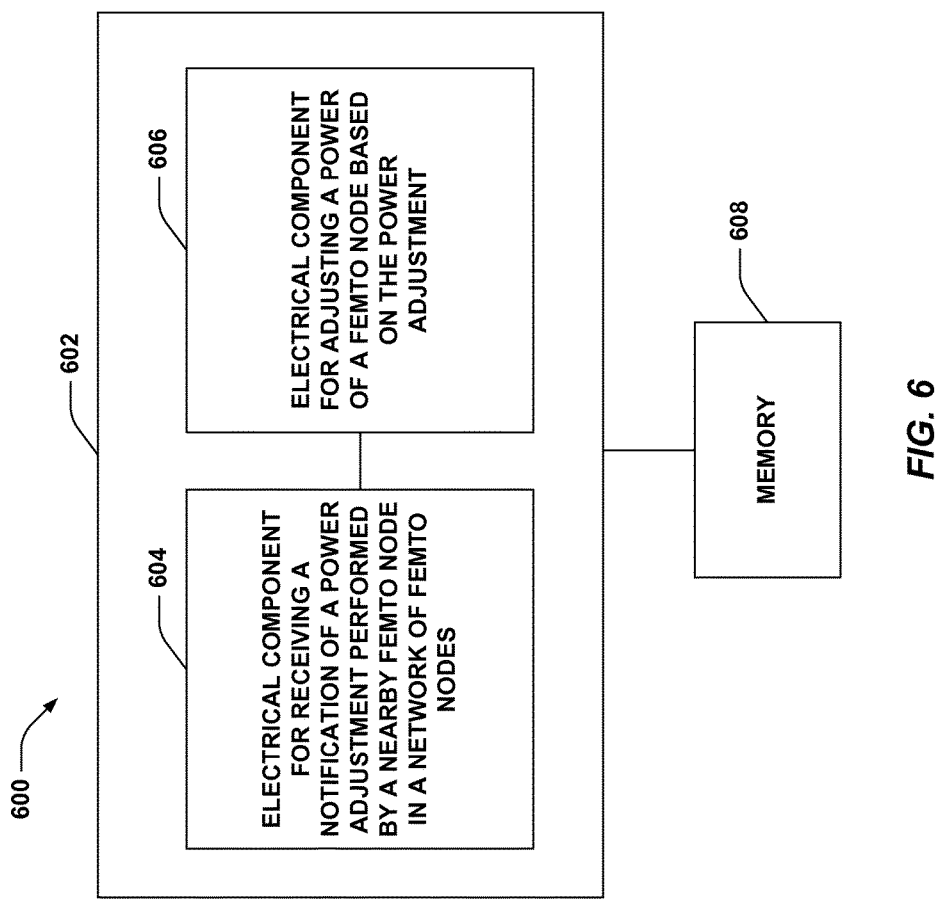
FIG. 6 is a block diagram of an example system that adjusts power of a femto node based on a power adjustment of a nearby femto node.

With reference to FIG. 6, illustrated is a system 600 for adjusting power of a femto node. For example, system 600 can reside at least partially within a femto node. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for receiving a notification of a power adjustment performed by a nearby femto node in a network of femto nodes 604. For example, the notification can be received from the nearby femto node over a backhaul connection and/or from a centralized entity.

Further, logical grouping 602 can comprise an electrical component for adjusting a power of a femto node based on the power adjustment 606. As described, power of the femto node can be adjusted proportionally to the power adjustment of the nearby femto node to fill a coverage gap left by the nearby femto node when decreasing power. For example, electrical component 604 can include a power modification receiving component 222, as described above. In addition, for example, electrical component 606, in an aspect, can include a power modifying component 224, as described above.

Additionally, system 600 can include a memory 608 that retains instructions for executing functions associated with the electrical components 604 and 606. While shown as being external to memory 608, it is to be understood that one or more of the electrical components 604 and 606 can exist within memory 608. In one example, electrical components 604 and 606 can comprise at least one processor, or each electrical component 604 and 606 can be a corresponding module of at least one processor. Moreover, in an additional or alternative example, electrical components 604 and 606 can be a computer program product comprising a computer readable medium, where each electrical component 604 and 606 can be corresponding code.

Figure 7:
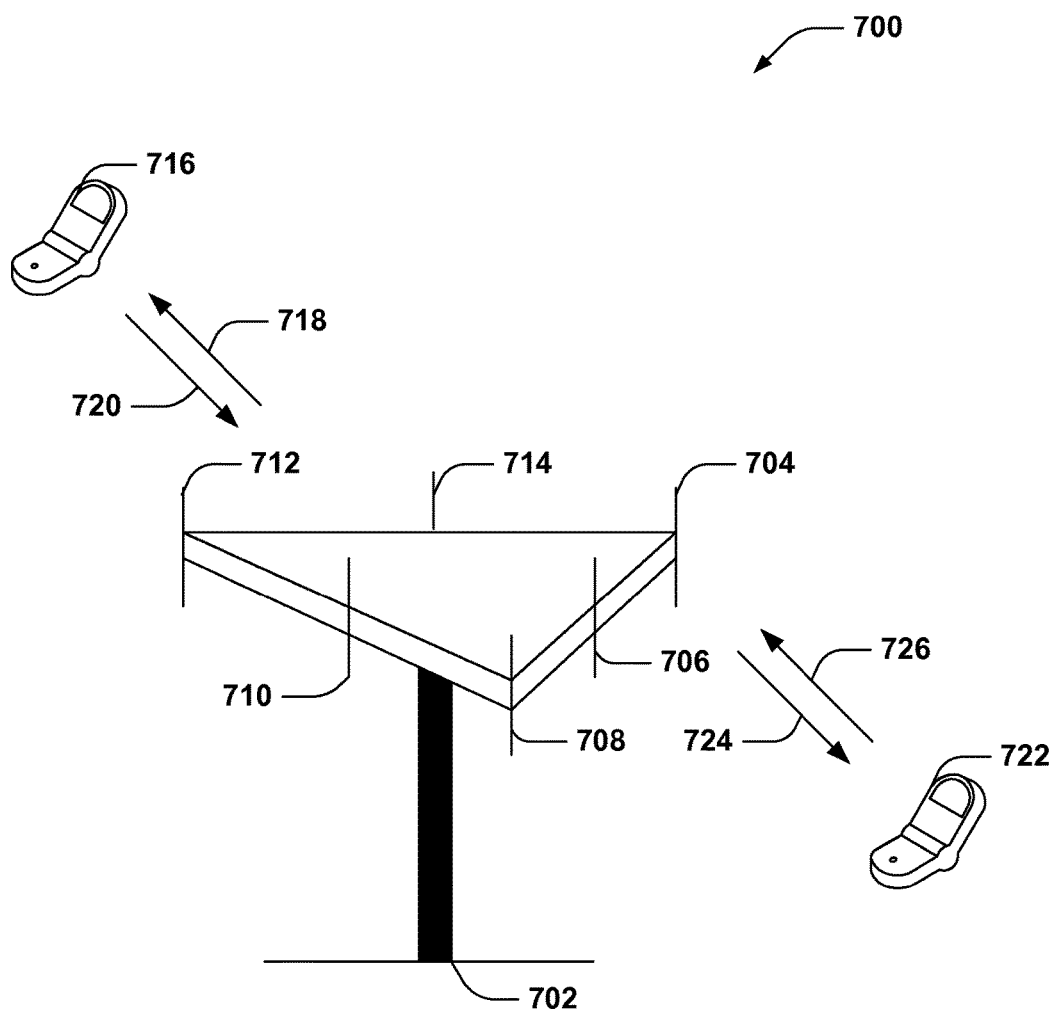
FIG. 7 is a block diagram of an example wireless communication system in accordance with various aspects set forth herein.

Referring now to FIG. 7, a wireless communication system 700 is illustrated in accordance with various embodiments presented herein. System 700 comprises a base station 702 that can include multiple antenna groups. For example, one antenna group can include antennas 704 and 706, another group can comprise antennas 708 and 710, and an additional group can include antennas 712 and 714. Two antennas are illustrated for each antenna group; however, more or fewer antennas can be utilized for each group. Base station 702 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 702 can communicate with one or more mobile devices such as mobile device 716 and mobile device 722; however, it is to be appreciated that base station 702 can communicate with substantially any number of mobile devices similar to mobile devices 716 and 722. Mobile devices 716 and 722 can be, for example, cellular phones, smart phones, laptops, handheld communication devices, handheld computing devices, satellite radios, global positioning systems, PDAs, and/or any other suitable device for communicating over wireless communication system 700. As depicted, mobile device 716 is in communication with antennas 712 and 714, where antennas 712 and 714 transmit information to mobile device 716 over a forward link 718 and receive information from mobile device 716 over a reverse link 720. Moreover, mobile device 722 is in communication with antennas 704 and 706, where antennas 704 and 706 transmit information to mobile device 722 over a forward link 724 and receive information from mobile device 722 over a reverse link 726. In a frequency division duplex (FDD) system, forward link 718 can utilize a different frequency band than that used by reverse link 720, and forward link 724 can employ a different frequency band than that employed by reverse link 726, for example. Further, in a time division duplex (TDD) system, forward link 718 and reverse link 720 can utilize a common frequency band and forward link 724 and reverse link 726 can utilize a common frequency band.

Each group of antennas and/or the area in which they are designated to communicate can be referred to as a sector of base station 702. For example, antenna groups can be designed to communicate to mobile devices in a sector of the areas covered by base station 702. In communication over forward links 718 and 724, the transmitting antennas of base station 702 can utilize beamforming to improve signal-to-noise ratio of forward links 718 and 724 for mobile devices 716 and 722. Also, while base station 702 utilizes beamforming to transmit to mobile devices 716 and 722 scattered randomly through an associated coverage, mobile devices in neighboring cells can be subject to less interference as compared to a base station transmitting through a single antenna to all its mobile devices. Moreover, mobile devices 716 and 722 can communicate directly with one another using a peer-to-peer or ad hoc technology as depicted. According to an example, system 700 can be a multiple-input multiple-output (MIMO) communication system.

Figure 8:
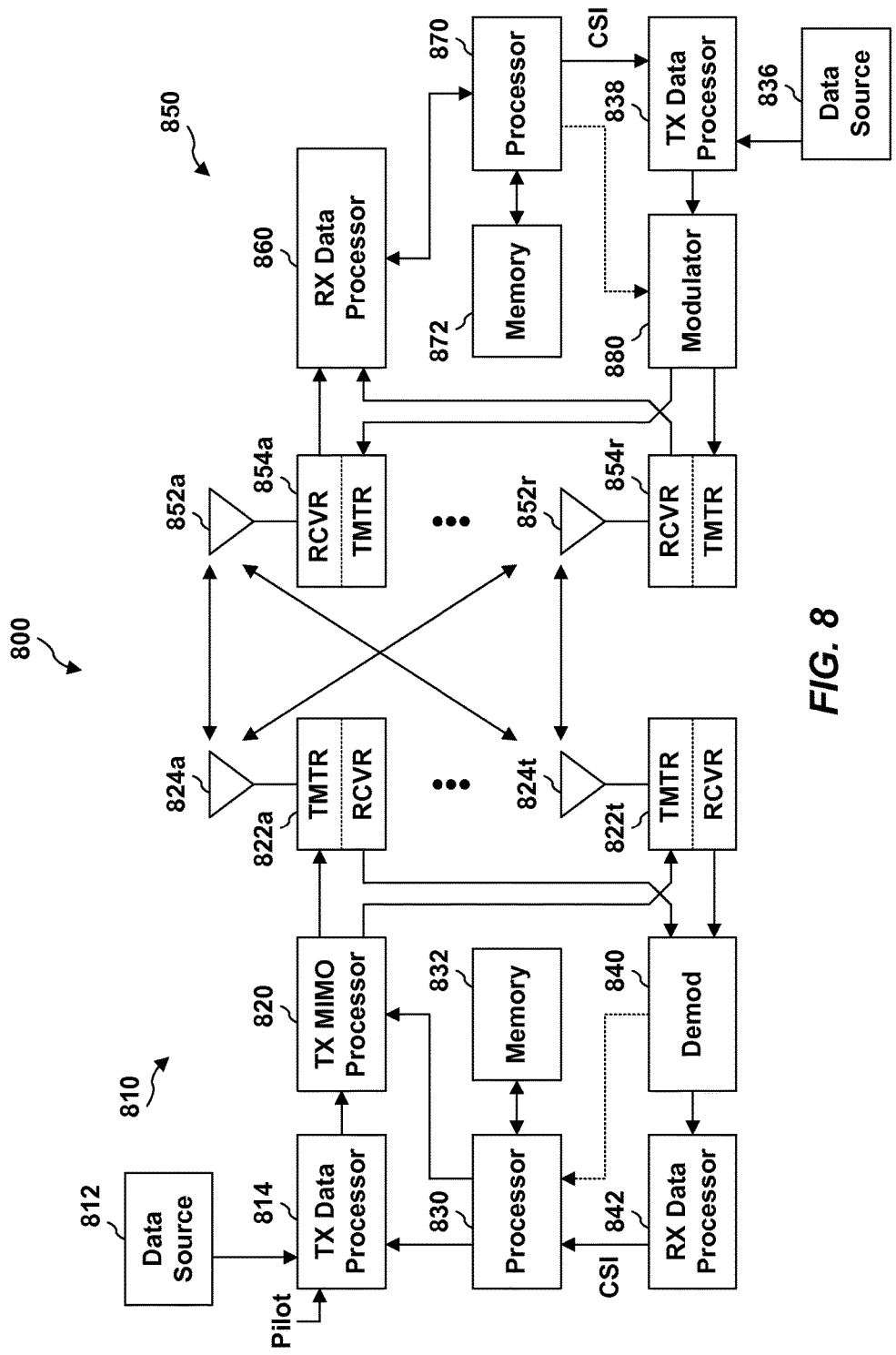
FIG. 8 is an illustration of an example wireless network environment that can be employed in conjunction with the various systems and methods described herein.

FIG. 8 shows an example wireless communication system 800. The wireless communication system 800 depicts one base station 810, which can include a femto node, and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1, 2, and 5-7) and/or methods (FIGS. 3-4) described herein to facilitate wireless communication there between. For example, components or functions of the systems and/or methods described herein can be part of a memory 832 and/or 872 or processors 830 and/or 870 described below, and/or can be executed by processors 830 and/or 870 to perform the disclosed functions.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform functionalities described herein to support adjusting transmit power of one or more femto nodes.

Figure 9:
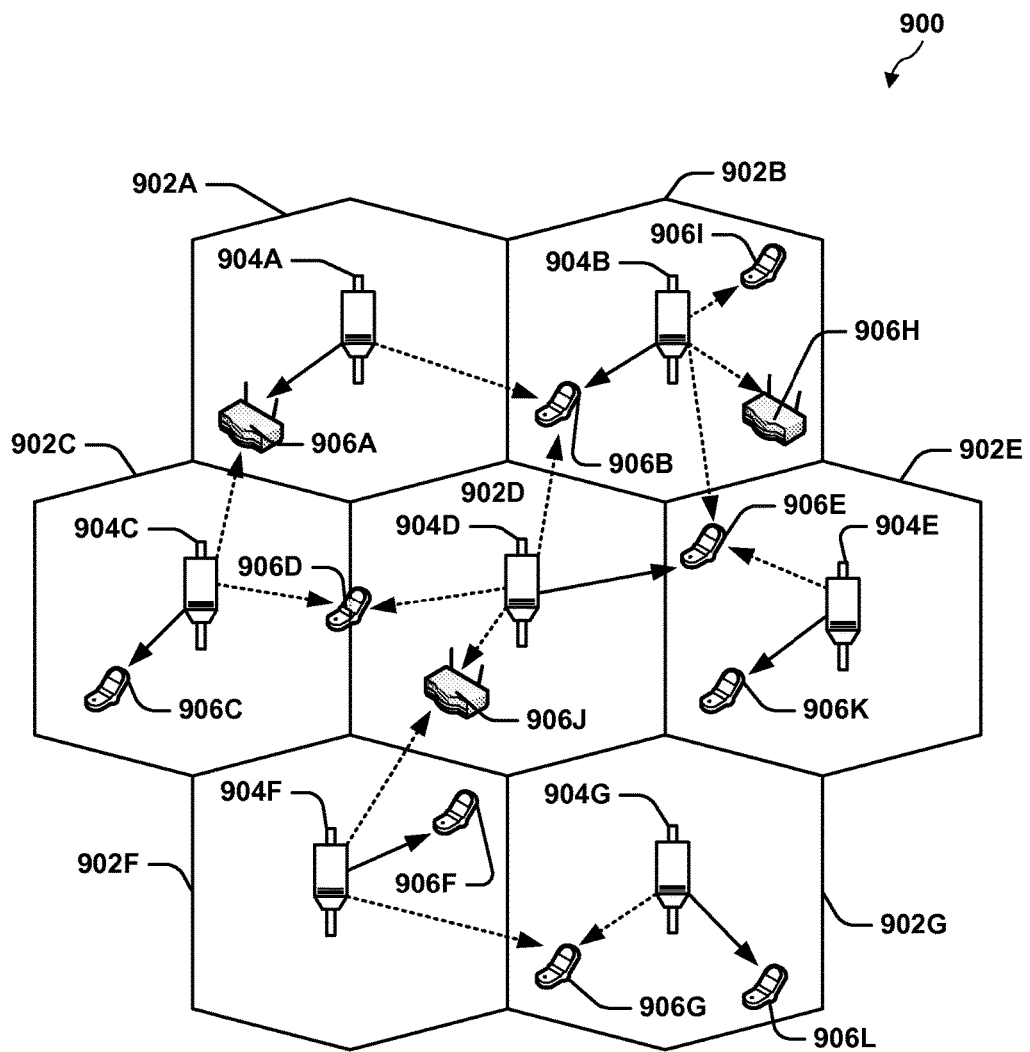
FIG. 9 illustrates an example wireless communication system, configured to support a number of devices, in which the aspects herein can be implemented.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access node 904 (e.g., access nodes 904A-904G). As shown in FIG. 9, access terminals 906 (e.g., access terminals 906A-906L) can be dispersed at various locations throughout the system over time. Each access terminal 906 can communicate with one or more access nodes 904 on a forward link (FL) and/or a reverse link (RL) at a given moment, depending upon whether the access terminal 906 is active and whether it is in soft handoff, for example. The wireless communication system 900 can provide service over a large geographic region.

Figure 10:
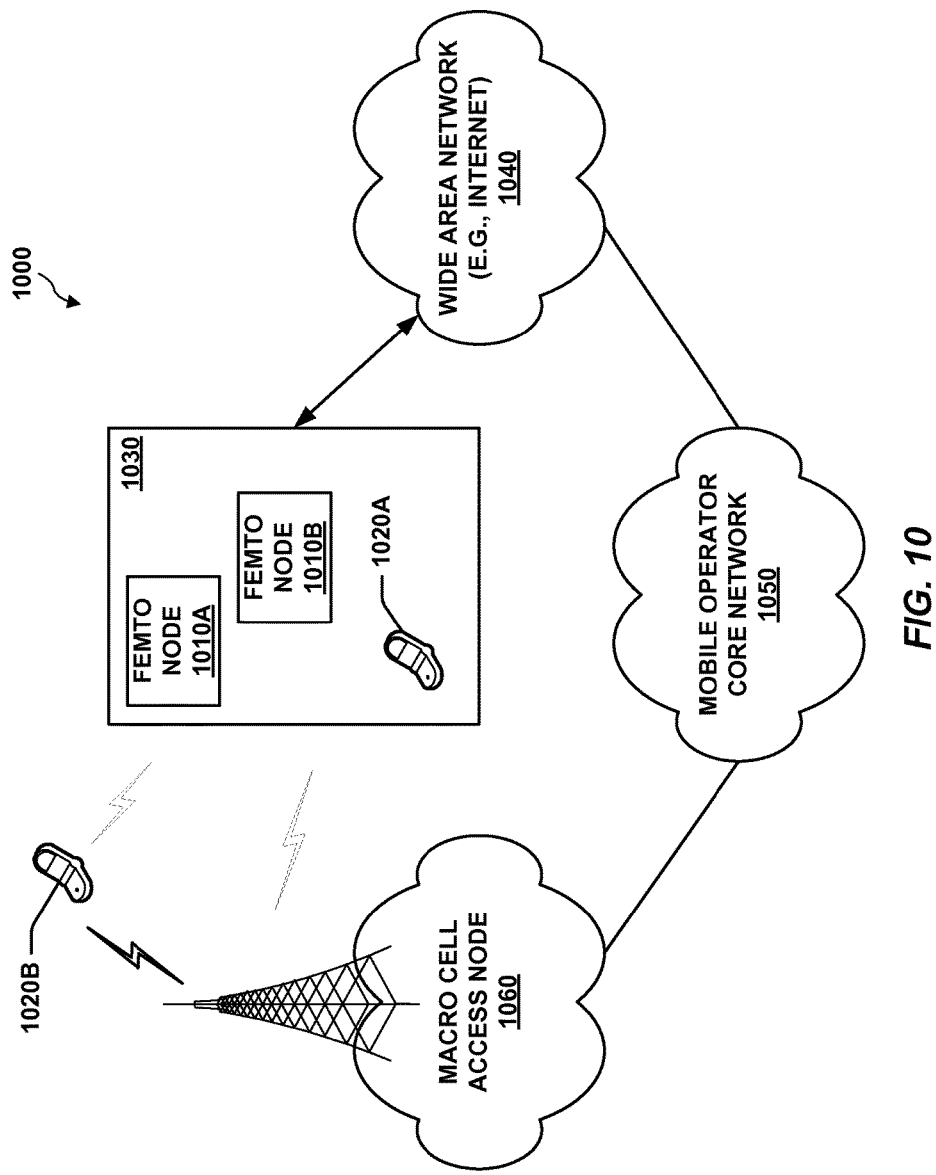
FIG. 10 is an illustration of an exemplary communication system to enable deployment of femtocells within a network environment.

FIG. 10 illustrates an exemplary communication system 1000 where one or more femto nodes are deployed within a network environment. Specifically, the system 1000 includes multiple femto nodes 1010A and 1010B (e.g., femtocell nodes or H(e)NB) installed in a relatively small scale network environment (e.g., in one or more user residences 1030). Each femto node 1010 can be coupled to a wide area network 1040 (e.g., the Internet) and a mobile operator core network 1050 via a digital subscriber line (DSL) router, a cable modem, a wireless link, or other connectivity means (not shown). As will be discussed below, each femto node 1010 can be configured to serve associated access terminals 1020 (e.g., access terminal 1020A) and, optionally, alien access terminals 1020 (e.g., access terminal 1020B). In other words, access to femto nodes 1010 can be restricted such that a given access terminal 1020 can be served by a set of designated (e.g., home) femto node(s) 1010 but may not be served by any non-designated femto nodes 1010 (e.g., a neighbor's femto node).

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 can be defined with a given tracking area 1102 or macro coverage area 1104. Also, one or more pico coverage areas (not shown) can be defined within a given tracking area 1102 or macro coverage area 1104.

Referring again to FIG. 10, the owner of a femto node 1010 can subscribe to mobile service, such as, for example, 3G mobile service, offered through the mobile operator core network 1050. In another example, the femto node 1010 can be operated by the mobile operator core network 1050 to expand coverage of the wireless network. In addition, an access terminal 1020 can be capable of operating both in macro environments and in smaller scale (e.g., residential) network environments. Thus, for example, depending on the current location of the access terminal 1020, the access terminal 1020 can be served by a macro cell access node 1060 or by any one of a set of femto nodes 1010 (e.g., the femto nodes 1010A and 1010B that reside within a corresponding user residence 1030). Here, it should be appreciated that a femto node 1010 can be backward compatible with existing access terminals 1020.

A femto node 1010 can be deployed on a single frequency or, in the alternative, on multiple frequencies. Depending on the particular configuration, the single frequency or one or more of the multiple frequencies can overlap with one or more frequencies used by a macro cell access node (e.g., node 1060). In some aspects, an access terminal 1020 can be configured to connect to a preferred femto node (e.g., the home femto node of the access terminal 1020) whenever such connectivity is possible. For example, whenever the access terminal 1020 is within the user's residence 1030, it can communicate with the home femto node 1010.

In some aspects, if the access terminal 1020 operates within the mobile operator core network 1050 but is not residing on its most preferred network (e.g., as defined in a preferred roaming list), the access terminal 1020 can continue to search for the most preferred network (e.g., femto node 1010) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1020 can limit the search for specific band and channel. For example, the search for the most preferred system can be repeated periodically. Upon discovery of a preferred femto node, such as femto node 1010, the access terminal 1020 selects the femto node 1010 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1010 that reside within the corresponding user residence 1030). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

In an aspect, incorporated is an Appendix A (attached). Appendix A describes example aspects for load-based autonomous power calibration for networks of femto nodes.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing load in a network of low power base stations, comprising:
   detecting one or more parameters corresponding to a resource load on a low power base station;
   determining that one or more other low power base stations, which do not include the low power base station, can serve a device communicating with the low power base station;
   adjusting a transmit power of the low power base station based on the one or more parameters to decrease a resource load on the low power base station and based in part on the determining that the one or more other low power base station can serve the device; and
   communicating, by the low power base stations and at the adjusted transmit power, with one or more devices.

2. The method of claim 1, wherein the determining that the one or more other low power base stations can serve the device is based in part on a signal quality of the one or more other low power base stations received from the device.

3. The method of claim 1, wherein the determining that the one or more other low power base stations can serve the device is based in part on determining that the device may be out of range of the low power base station after adjusting the transmit power based on a signal quality of the low power base station received from the device.

4. The method of claim 1, further comprising handing over the device to the one or more other low power base stations prior to adjusting the transmit power of the low power base station.

5. The method of claim 1, wherein the transmit power is adjusted based in part on determining that the device has transitioned to an idle communications mode.

6. The method of claim 1, wherein the one or more parameters correspond to an expected resource load on the low power base station.

7. The method of claim 1, wherein the one or more parameters comprise one or more of a channel element availability, a downlink channel resource availability, a received uplink power level or resource availability, a number of scheduled resources, and a backhaul bandwidth availability.

8. An apparatus for managing load in a network of low power base stations, comprising:
   at least one processor configured to:
      detect one or more parameters corresponding to a resource load on a low power base station;
      determine that one or more other low power base stations, which do not include the low power base station, can serve a device communicating with the low power base station;
      adjust a transmit power of the low power base station based on the one or more parameters to decrease a resource load on the low power base station and based in part on the determining that the one or more other low power base stations can serve the device; and
      communicate, by the low power base station and at the adjusted transmit power, with one or more devices; and
   a memory coupled to the at least one processor.

9. The apparatus of claim 8, wherein the at least one processor determines that the one or more other low power base stations can serve the device based in part on a signal quality of the one or more other low power base stations received from the device.

10. The apparatus of claim 8, wherein the one or more parameters correspond to an expected resource load on the low power base station.

11. The apparatus of claim 8, wherein the one or more parameters comprise one or more of a channel element availability, a downlink channel resource availability, a received uplink power level or resource availability, a number of scheduled resources, and a backhaul bandwidth availability.

12. An apparatus for managing load in a network of low power base stations, comprising:
   means for detecting one or more parameters corresponding to a resource load on a low power base station;
   means for determining that one or more other low power base stations, which do not include the low power base station, can serve a device communicating with the low power base station;
   means for adjusting a transmit power of the low power base station based on the one or more parameters to decrease a resource load on the low power base station and based in part on the determining that the one or more other low power base stations can serve the device; and means for communicating, by the low power base station and at the adjusted transmit power, with one or more devices.

13. The apparatus of claim 12, wherein the means for determining determines that the one or more other low power base stations can serve the device based in part on a signal quality of the one or more other low power base stations received from the device.

14. The apparatus of claim 12, wherein the one or more parameters correspond to an expected resource load on the low power base station.

15. The apparatus of claim 14, wherein the one or more parameters comprise one or more of a channel element availability, a downlink channel resource availability, a received uplink power level or resource availability, a number of scheduled resources, and a backhaul bandwidth availability.

16. A non-transitory computer-readable medium, comprising:
    code for causing at least one computer to detect one or more parameters corresponding to a resource load on a low power base station;
    code for determining that one or more other low power base stations, which do not include the low power base station, can serve a device communicating with the low power base station;
    code for causing the at least one computer to adjust a power of the low power base station based on the one or more parameters to decrease a resource load on the low power base station and based in part on the determining that the one or more other low power base stations can serve the device; and
    code for communicating, by the low power base station and at the adjusted transmit power, with one or more devices.

17. The non-transitory computer-readable medium of claim 16, wherein the code for causing the at least one computer to adjust determines that the one or more other low power base stations can serve the device based in part on a signal quality of the one or more other low power base stations received from the device.

18. The non-transitory computer-readable medium of claim 16, wherein the one or more parameters correspond to an expected resource load on the low power base station.

19. The non-transitory computer-readable medium of claim 16, wherein the one or more parameters comprise one or more of a channel element availability, a downlink channel resource availability, a received uplink power level or resource availability, a number of scheduled resources, and a backhaul bandwidth availability.

20. The method of claim 1, further comprising notifying the one or more other low power base stations of the adjusting the power of the low power base station.

21. The apparatus of claim 8, wherein the at least one processor is further configured to notify the one or more other low power base stations of adjusting the power of the low power base station.

* * * * *